United States Patent

[11] 3,523,488

| [72] | Inventor | Hugh A. Robinson |
| | | Wenham, Massachusetts |
| [21] | Appl. No. | 772,757 |
| [22] | Filed | Nov. 1, 1968 |
| [45] | Patented | Aug. 11, 1970 |
| [73] | Assignee | USM Corporation |
| | | Flemington, New Jersey |
| | | a Corp. of New Jersey |

[54] FLUIDIC STEPPING MOTORS
4 Claims, 3 Drawing Figs.

[52] U.S. Cl. .................................... 91/180, 74/640
[51] Int. Cl. .................................... F01l 33/02, F16h 33/20
[50] Field of Search .......................... 74/640, 804(Partially); 91/204, 205, 180

[56] References Cited
UNITED STATES PATENTS

| 717,445 | 12/1902 | Nestus............................ | 91/180 |
| 2,545,774 | 3/1951 | Griswold....................... | 91/180 |
| 3,088,333 | 5/1963 | Musser.......................... | 74/640 |
| 3,165,029 | 1/1965 | Haldimann..................... | 91/180 |
| 3,362,254 | 1/1968 | Lewis............................ | 74/640 |

*Primary Examiner*— Arthur T. McKeon
*Attorneys*—W. Bigelow Hall, Richard A. Wise and Carl E. Johnson

ABSTRACT: Pulsated fluid is employed to effect a circumferential wave of radial deflection in the flexspline of a harmonic drive type transmission to provide an effective control device of high response characteristics. An elastomeric wave generator comprises a tubular diaphragm diametrically opposite portions of which are sequentially pressurized circumferentially to drive a flexspline or its cooperating coaxial circular spline.

Inventor
Hugh A. Robinson
By his Attorney
Carl E. Johnson.

3,523,488

FLUIDIC STEPPING MOTORS

BACKGROUND OF THE INVENTION

This invention pertains to fluid motors and more especially to a fluid pressure actuator of the type employing chambers sequentially energizable to provide controlled motion. Preferably, and as herein shown, the invention is directed to the provision of a novel pneumatic wave generator mechanism for controlling the rotary output of harmonic drive gearing.

In one aspect the present invention may be considered to resemble that disclosed in United States Letters Patent No. 3,088,333, granted May 7, 1963 upon an application of C. Walton Musser and assigned to the present assignee, in that a fluid pressure mechanism causes wave progression in a flexspline. In that arrangement opposed radial pistons are forced apart to shape the flexspline by hydraulic pressure under the control of a rotary valve, and the input inertia is advantageously low. In the present arrangement, being more especially concerned with attaining high response angular control than in deriving an output torque, the shaping and rotating of the wave generator is preferably effected pneumatically without utilizing piston-cylinder devices.

SUMMARY OF THE INVENTION

It accordingly is a primary object of this invention to provide an improved fluidic device for precisely controlling angular movement. To this end selected chambers defined by a generally cylindrical diaphragm are inflated or pulsated by fluid, preferably gas under pressure, each energized chamber acting radially on a flexspline to shape it and progress its shape thereby rotating either the flexspline or (a differentially toothed reaction) circular spline in mesh therewith. Aside from the advantages of circumventing difficulties usually associated with hydraulic leaks and expending energy to reverse piston movements, the present invention affords a compact, low inertia, angular stepper of reliable and economical construction.

BRIEF DESCRIPTION OF THE DRAWINGS

The foregoing and other features of the invention including various novel details of construction will now be more particularly described in connection with an illustrative embodiment thereof, and with reference to the accompanying drawings, in which.

DESCRIPTION OF THE PREFERRED EMBODIMENT

It will be understood that, in common with harmonic drive actuators hitherto known, a wave generator mechanism may alternatively be internal for effecting radial deflection outwardly as herein shown, or it may be external for radially deflecting inwardly. Moreover, it will be appreciated that while either one of the flexspline and the cooperating circular spline normally serves as a stationary reaction member while the other is rotatably driven, the circular spline is hereinafter described, by way of illustration only, as constituting an external output member.

Figure 1:
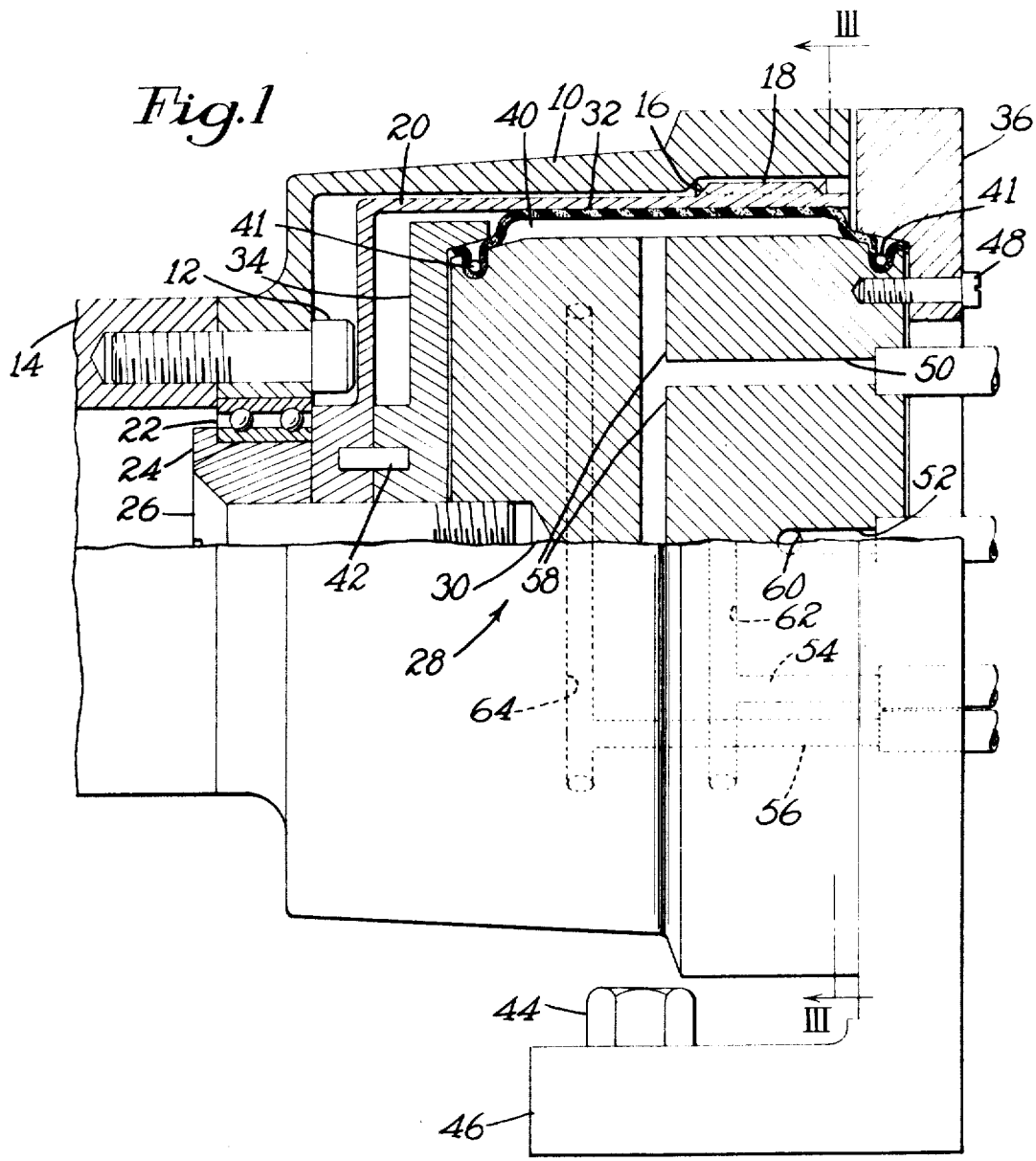
FIG. 1 is a view in side elevation of a fluidic stepping motor, an upper quadrant being broken away to reveal internal structure.
Figure 2:
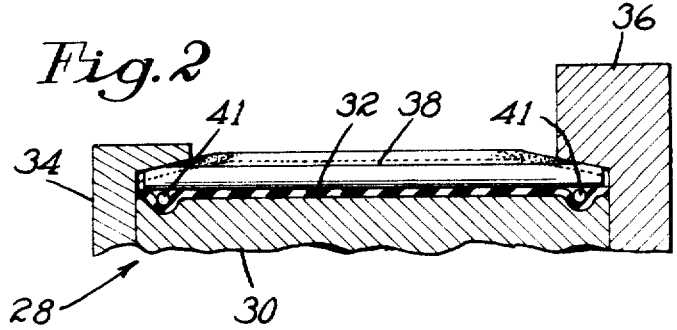
FIG. 2 is a detail view indicating the clamping of a membrane partition pin.

In FIG. 1 a fluidic stepping motor is disclosed comprising a cup-shaped circular spline 10. This spline has its closed end bored to receive bolts 12 (one only shown) for coupling to a shaft 14 or other member to be driven. The opposite end of the spline 10 is circumferentially formed with internal spline teeth 16 (FIGS. 1, 2) arranged to mesh with circumferential external spline teeth 18 on a coaxial cup-shaped flexspline 20. It is to be understood that while a 2-lobed arrangement is herein illustrated for purposes of simplicity and clear understanding, a 3 or more lobed construction is within the scope of this invention. In this instance the flexspline 20 is bodily held stationary as will be described, and an elliptoidal wave shape will be imposed on the flexspline teeth 18 to propagate therein a circumferential wave of radial deflection. Accordingly, as in harmonic drive actuators previously disclosed, the flexspline has fewer teeth 18 than the circular spline teeth 16 by two or a multiple thereof. For supporting the shaft 14 and the circular spline 10 for rotation relative to the flexspline 20 a bearing 22 is mounted on a spacer block 24 bored to receive a take-up bolt 26. The latter is threadedly received coaxially in a fluidic wave generator means generally designated 28 next to be described.

Figure 3:
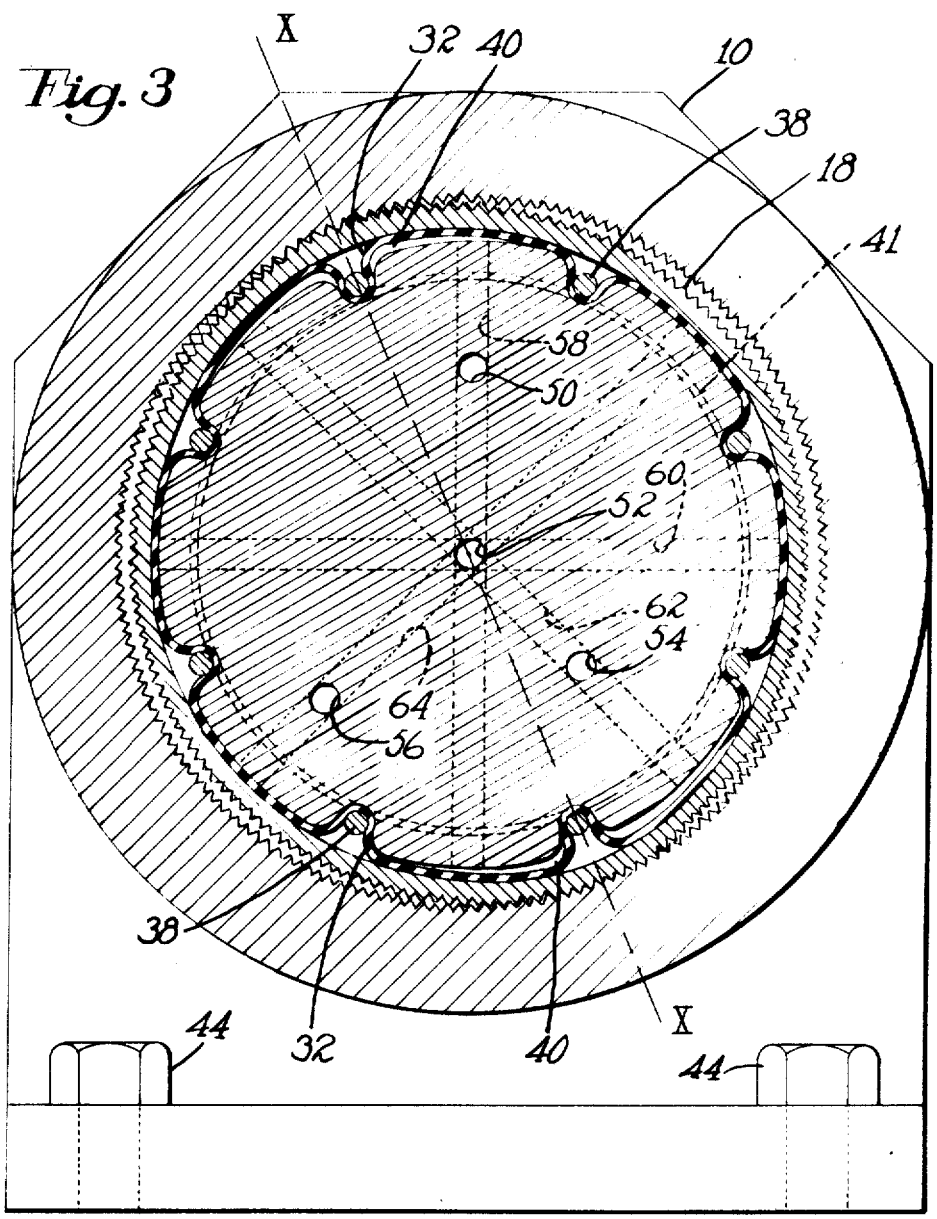
FIG. 3 is a vertical section taken on the line III-III in FIG. 1 and showing, in pulsated condition, the chambers of a wave generator diaphragm shown in FIG. 1.

The wave generator means 28 comprises a drum 30, an encircling membrane 32 thereon preferably of elastomeric material, end caps 34, 36 for respectively clamping circumferential margins of the membrane 32 in sealing relation on the drum 30, and a plurality of parallel partition pins 38 (FIGS. 2 and 3) for dividing the membrane effectively into a circular series of chambers 40 (eight in the arrangement shown) defined by the periphery of the drum 30 and the inner side of the membrane 32. The pins 38 are respectively held in axial notches on the periphery of the drum and in clamped relation to the membrane 32 by means of the end caps 34, 36. Better to insure an air-tight seal circumferential grooves on the respective ends of the drum 30 may underlie clamping wires 41 looped over the membrane 32 and drawn taut. As shown in FIG. 1 the flexspline 20 is axially secured by the take-up bolt 26 to the end cap 34, the bolt being screwed into the drum 30, and a pin 42 nested in the flexspline 20 and the end cap 34 prevents relative rotation. The end cap 36 is secured in fixed position as by cap bolts 44 extending through a base flange 46. For holding the drum 30 and hence the flexspline 20 grounded against rotation, bolts 48 extend axially through the cap 36 and into the drum 30.

For energizing the chambers 40 in a selected sequence to deflect the flexspline 20 radially and thereby rotationally drive its major axis X-X (FIG. 3) in either direction, a suitable source of fluid pulsing pressure and/or switching means (not shown) is coupled to the drum 30. For this purpose inlet axial bores 50, 52, 54 and 56 formed in the drum 30 and communicating through the cap 36 are respectively connected to axially offset, angularly spaced diametric bores 58, 60, 62 and 64 respectively having communication with diametrically opposed chambers 40. The illustrative arrangement is such that successive diametrically opposed adjacent pairs of the eight chambers 40 are simultaneously pulsated. The resultant major axis effected in the flexspline 20 during such pressurizing extends, in one position of the rotating axis, substantially through diametrically opposed partition pins 38, 38, for instance as shown at X-X in FIG. 3. While it is within the scope of this invention to successively pulsate only single diametrically opposed chambers 40, and in either direction of rotation, transitional operation and hence progressive angular control is generally smoother when opposite adjacent chambers 40 are simultaneously energized. Thus in FIG. 3 the bores 58, 62 are both energized at one time, and depending on the direction of drive, the bores 58, 64 will next be simultaneously pulsated for clockwise movement of the axis X-X, or the bores 62, 60 will be pulsated for its counterclockwise movement. This is to say that as pressure to one pair of diametrically opposed chambers 40 is decreased another pair is pressurized circumferentially to step the major axis in the desired direction.

In rotating the elliptoidal shape of the flexspline 20 (but not the flexspline bodily) the circular spline 10, by reason of its tooth differential, is rotated with controlled output speed and practically no input inertia is experienced.

I claim:

1. In a fluid operated motor, a relatively rotatable circular spline and a flexspline coaxial therewith, the flexspline having spline teeth engageable at circumferentially spaced localities with the spline teeth of said circular spline, the circular spline and flexspline having different numbers of teeth and being out of mesh at intermediate circumferential localities, and a fluid pressure responsive wave generator means for radially deflecting the flexspline to effect its tooth engagements and propagate the wave of deflection, said means comprising on the side of the flexspline remote from the circular spline a membrane divided into a circumferential series of chambers, and means for sequentially pulsating selected pairs of said chambers to create a rotating harmonic wave to drive either the flexspline or circular spline, with the non-driven member grounded.

2. A motor as set forth in Claim 1 wherein said wave generator means includes a drum to the marginal periphery of which said membrane is secured, a plurality of elements axially disposed on the drum for sealing the membrane thereto between said chambers, and other means for sealing the ends of said chambers.

3. A motor as set forth in Claim 1 wherein said wave generator means includes a stationary drum for supporting said membrane coaxial with the circular spline and the flexspline, said drum being formed with angularly spaced diametrical holes for respectively transmitting pressure fluid to diametrically opposed ones of said chambers.

4. A pressure fluid stepping motor comprising a coaxial circular spline and a flexspline, the circular spline being rotatably mounted and having internal spline teeth arranged to mesh with circumferentially spaced reaction spline teeth of the flexspline, the flexspline teeth being fewer in number than those of the circular spline, and a fluid pressure responsive wave generator for progressing the localities of spline tooth engagement, said generator comprising a stationary drum coaxial with said splines and within the flexspline, a circumferential series of radially expansive chambers supported in sealed relation on the drum, and means for sequentially pulsating a pressure fluid simultaneously in selected diametrically opposite chambers.